United States Patent [19]

Hunt

[11] Patent Number: 5,150,290

[45] Date of Patent: Sep. 22, 1992

[54] PROCESSOR ARRAY SYSTEM INCORPORATING N-BIT SCALAR PROCESSOR AND M X M-BIT PROCESSOR ARRAY

[75] Inventor: David J. Hunt, Wokingham, United Kingdom, RG11 1AZ

[73] Assignee: AMT (Holdings) Ltd., Reading, United Kingdom

[21] Appl. No.: 397,709

[22] Filed: Aug. 23, 1989

[30] Foreign Application Priority Data

Aug. 25, 1988 [GB] United Kingdom ............... 8820237

[51] Int. Cl.⁵ .................... G06F 15/80; G06F 15/16
[52] U.S. Cl. ..................... 364/736; 364/231.9; 364/228; 364/DIG. 1
[58] Field of Search ... 364/200 MS File, 900 MS File, 364/748, 736, 715

[56] References Cited

U.S. PATENT DOCUMENTS

| | | | |
|---|---|---|---|
| 4,101,960 | 7/1978 | Stokes et al. | 364/200 |
| 4,107,773 | 8/1978 | Gilbreath et al. | 364/200 |
| 4,365,292 | 12/1982 | Barnes et al. | 364/200 |
| 4,412,303 | 10/1983 | Barnes et al. | 364/900 |
| 4,543,642 | 9/1985 | Hansen | 364/900 |
| 4,720,784 | 1/1988 | Radhakrishnan et al. | 364/200 |
| 4,891,787 | 1/1990 | Gifford | 364/900 |

Primary Examiner—Allen R. MacDonald
Assistant Examiner—Gopal C. Ray
Attorney, Agent, or Firm—Lyon & Lyon

[57] ABSTRACT

A processor array system includes an n-bit scalar processor (2) and an m x m-bit processor array (1), m and n being integers, with m greater than n. The system also includes an array support circuit (3) which is connected between the scalar processor (2) and the processor array (1) and communicates data between them. The system may include an n-bit wide data path linking n-bit scalar processor registers in the scalar processor to the array support circuit (3) together with an m-bit wide data path linking the array support circuit (3) to the processor array (1). The array support circuit (3) includes a register interface arranged to interface the n-bit scalar processor registers to the processor array (1). The array support circuit (3) also includes an m-bit wide edge registers (ME) which is connected to the processor array (1) via the m-bit wide data path. The array may employ an SIMD architecture with each of a number of single bit processing elements having associated with it local store.

4 Claims, 5 Drawing Sheets

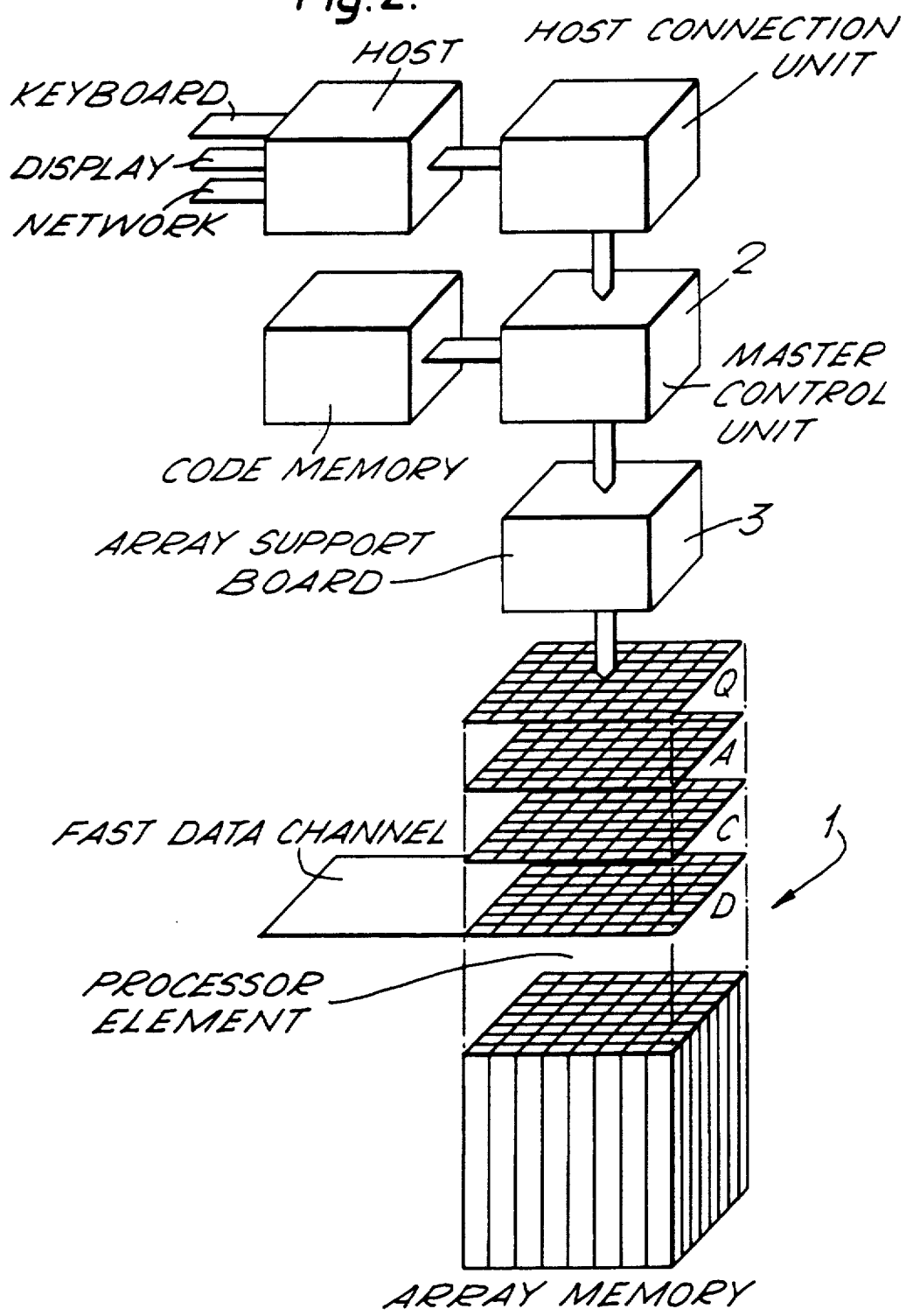

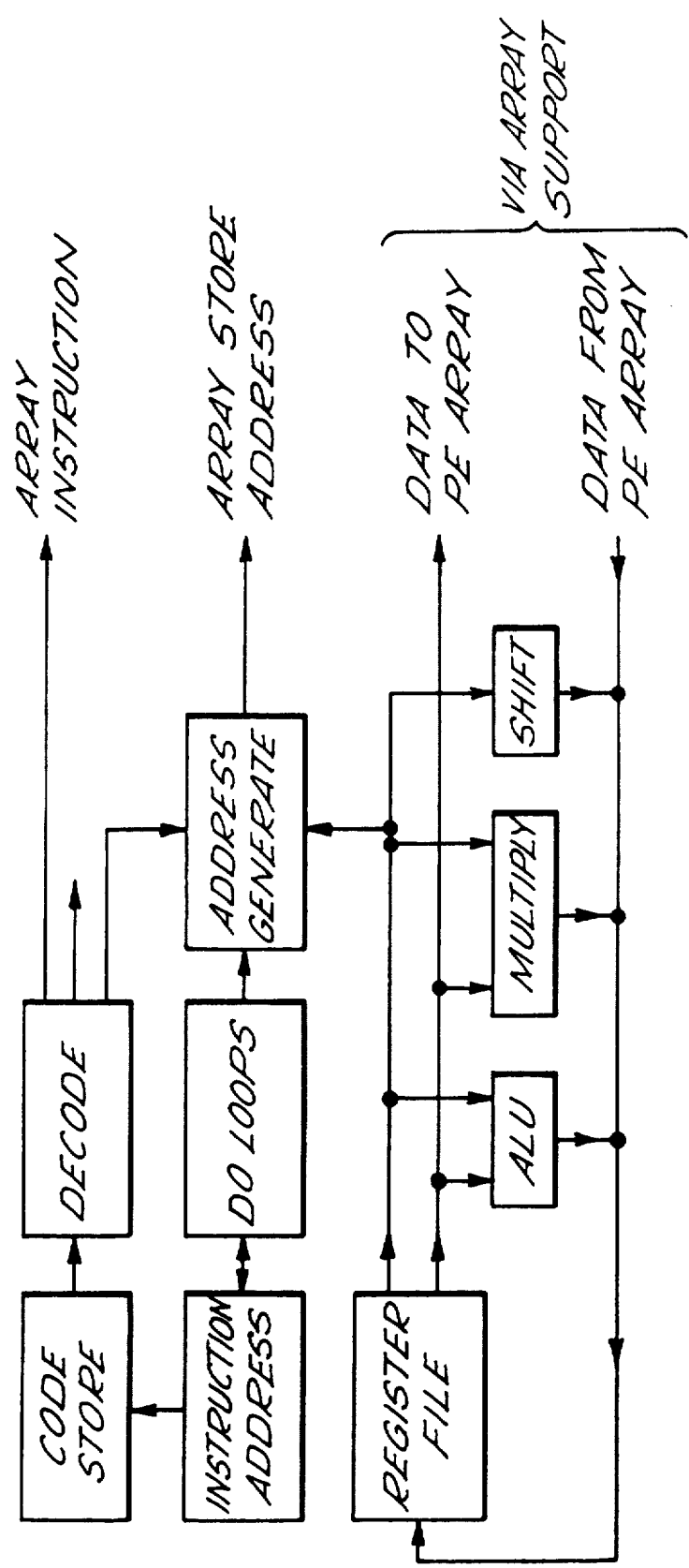

|  | 101 | 102 | 103 | 104 | 105 | 106 | 107 |
|---|---|---|---|---|---|---|---|
| EDGE REGISTER TO ARRAY | 1 | 1 | 0 | 0 | 0 | 0 | 0 |
| MCU TO ARRAY (MODE 1) | 0 | 0 | 1 | 0 | 1 | 0 | 0 |
| MCU TO ARRAY (MODE 2) | 0 | 0 | 1 | 1 | 0 | 0 | 0 |
| ARRAY TO EDGE REGISTER | 0 | 0 | 0 | 0 | 0 | 0 | 0 |
| ARRAY TO MCU (MODE 1) | 0 | 0 | 0 | 0 | 0 | 1 | 0 |
| ARRAY TO MCU (MODE 2; SELECT MS WORD) | 0 | 0 | 0 | 0 | 0 | 0 | 1 |
| ARRAY TO MCU (MODE 2; SELECT LS WORD) | 0 | 0 | 0 | 0 | 0 | 1 | 0 |

PROCESSOR ARRAY SYSTEM INCORPORATING N-BIT SCALAR PROCESSOR AND M X M-BIT PROCESSOR ARRAY

BACKGROUND TO THE INVENTION

The present invention relates to parallel processing computers and in particular to processor array systems incorporating a processor array and a scalar control unit for the array, the processor array system employing an SIMD architecture. One example of such a system is disclosed in the applicant's earlier British patent no. 1,445,714.

SUMMARY OF THE INVENTION

According to the present invention in a processor array system comprising an n-bit scalar processor and an m x m-bit processor array, m is greater than n and the system further comprises array support means linked to the scalar processor and to the processor array.

Preferably the system includes n-bit wide data paths linking n-bit scalar processor registers to the array support means and an m-bit wide data path linking the array support means to the array, the array support means comprising means to interface the n-bit scalar processor registers with the array, and an m-bit wide edge register connected to the array via the m-bit wide data path.

In known processor array systems such as that disclosed in the patent cited above, the scalar MCU has been matched in size to the dimensions of the array so that, for example, a 32-bit scalar MCU is used with a 32×32 processor array. Matching the MCU to the array size in this manner ensures that bottlenecks do not occur at the interface between the MCU and the array and simplifies the design of the system in that, for example, registers of a width appropriate for handling the output of the MCU can also be used to hold edge-sized values from the array.

In order to meet the need for greater processing power there has been a trend to take advantage of the higher levels of integration made possible by modern fabrication techniques to provide processor arrays with more processing elements. Thus 32×32 arrays have been succeeded by 64×64 arrays and so on. In each case the size of the MCU has been correspondingly upgraded to match the width of the enlarged array. Although the operating systems and most of the hardware for a typical processor array system can readily be adapted to cope with different array sizes changing the MCU from, for example, a 32-bit processor to a 64-bit processor, has proved a difficult, time consuming and costly task. Nonetheless it has been thought necessary to enlarge the MCU in this manner to gain the advantages discussed above and to realise all the potential of the enlarged array.

We have found that with the use of an appropriate interface an enlarged array can be effectively controlled by a smaller MCU so that, for example, a 32-bit scalar MCU can be used with a 64×64 bit processor array. Decoupling the MCU size and the array size in this manner greatly simplifies the design process when the array size is changed and makes it practical, for example, for a manufacturer to offer a range of systems with different array sizes but with a common MCU design and common software.

Preferably m is an integer multiple of n and the scalar processor includes addressing means arranged when in a first mode to address a specified row or column of the array so that values are written from one of the n-bit registers to the n-least significant bit positions of the specified row or column and arranged when in a second mode to address a specified n-bit word of the array so that values are written from one of the n-bit registers to the specified word position.

Preferably the m-bit wide data path linking the array support means to the array comprises a most significant word line and a least significant word line arranged in parallel and the means to interface include an LS word line driver connected on its output side to the least significant word line, an MS word line driver connected on its output side to the most significant word line, and a zero extend driver connected in common with the MS word line driver on its output side, when the scaler processor is in the row addressing mode either the MS word line driver or the zero extend driver being enabled in addition to the LS word line driver to replicate or zero extend respectively a word on the least significant word line.

BRIEF DESCRIPTION OF THE DRAWINGS

A system in accordance with the present invention is now described in detail with reference to the Figures of the accompanying drawings, in which:

FIG. 2 is a perspective block diagram of a computer incorporating the processor array system of FIG. 1;
FIG. 3 is a dataflow diagram of the MCU.

DESCRIPTION OF A PREFERRED EXAMPLE

A processor array system comprises a processor array 1, a scalar control unit (MCU) 2 and an array support unit 3. The array support unit 3 includes an edge register ME and interface circuitry 4.

The processor array comprises a two-dimensional array of single bit processing elements with the local store associated with each processing element providing a third addressable dimension. Such an array is described in British patent no. 1,445,714. In the present example the array is of dimensions 64×64, that is each row or column is 64 bits wide.

Figure 3A:
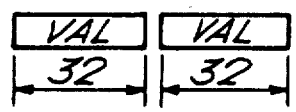
FIGS. 3A and 3B show a 64-bit row in word mode and in row/column mode; and,
FIG. 4 is a diagram of an array support unit.

The MCU 2 shown schematically in FIG. 3 includes a 32-bit scalar processor which operates to control the instruction execution and addressing of the array 1. The output from the 32-bit scalar processor is taken via a 32-bit wide data bus to the MCU registers. In the present example fourteen such general purpose MCU registers are used. These registers hold address modifiers or codestore link values and can be operated upon by MCU arithmetic or logic functions. The contents of these registers may be transferred to or from the array via the interface circuitry 4 in the array support unit 3.

While the data paths in the MCU 2 and between the MCU 2 and the array support unit 3 are 32 bits wide the path from the array support unit 3 to the array is 64 bits wide, comprising two parallel 32 bit paths. The edge register ME supplies data to and from the array via a 64-bit wide data bus 7. The edge register ME is used for such operations as extracting a row of data and replicating the row throughout the array. Apart from acting as a source or destination of data to or from the array the only other possible operation involving the edge register ME are shifting by one place or having its output tested by the function SKIP. Unlike the general purpose MCU registers the edge register ME cannot be used as a modifier. There is no direct data path between the MCU and the edge register ME so that ME becomes undefined if specified as the result of MCU arithmetic or logical operations other than a shift of one place, in which case the edge register ME is both source and destination. Conversely if the edge register ME is specified as the source data for an MCU arithmetic logical or shift operation then the data used by the MCU operation is undefined.

Figure 1:
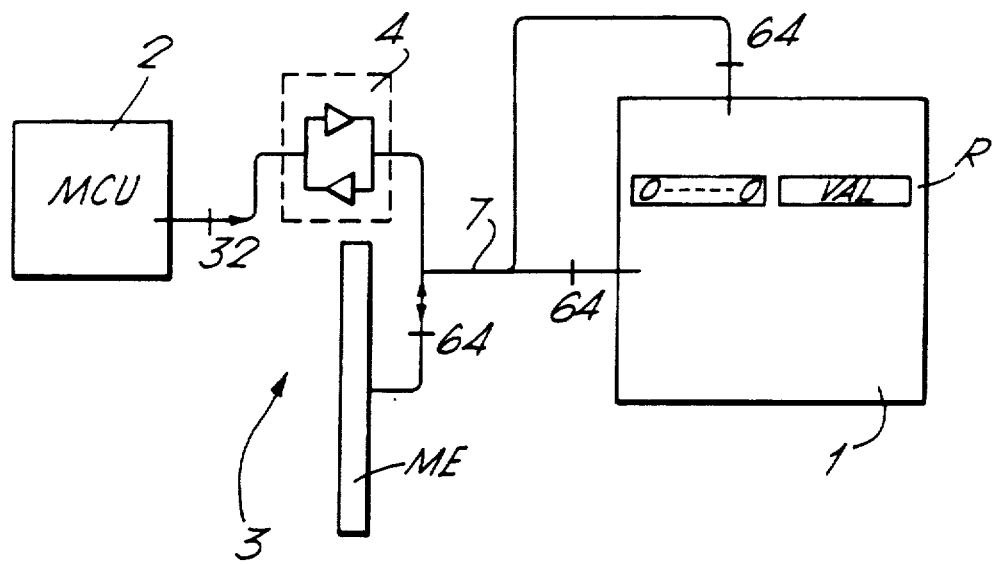
FIG. 1 is a block diagram of a processor array system.

There are two principal modes of addressing the array. In the default mode the MCU addresses specified rows of the array. In order to fill the 64-bit row the 32-bit data words from the MCU are either zero extended at the most significant end and written to the specified row, producing a row in which the first half is null and the second half takes the values supplied by the MCU as seen in row R of the processor array 1 in FIG. 1, or alternatively the 32-bit data word from the MCU is replicated to fill the row in the manner shown in FIG. 3A.

In the alternative mode of operation individual words within a specified row are addressed. In the present example each 64-bit row is divided into two 32-bit words. Data from the MCU registers are written to a selected word (i.e. part row or part column) of the array.

Figure 3B:
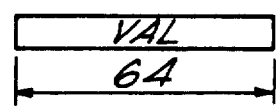

When the edge register ME is specified as the source of the data a 64-bit data word from the register ME is written to the array 1 to fill the specified row or column in the manner shown in FIG. 3B.

Just as the edge register and MCU registers provide different methods of writing data so there are corresponding methods of reading data from the array. When data is read in the default mode then the least significant word of the edge-sized response from the array is sent to the MCU and the rest of the response discarded. In the alternative mode bits from a specified word address within the specified row or column are selected from the edge-sized response and sent to the MCU so again the rest of the response is discarded. Alternatively the edge register ME is used and the edge-sized response transmitted whole to the register.

Figure 4:
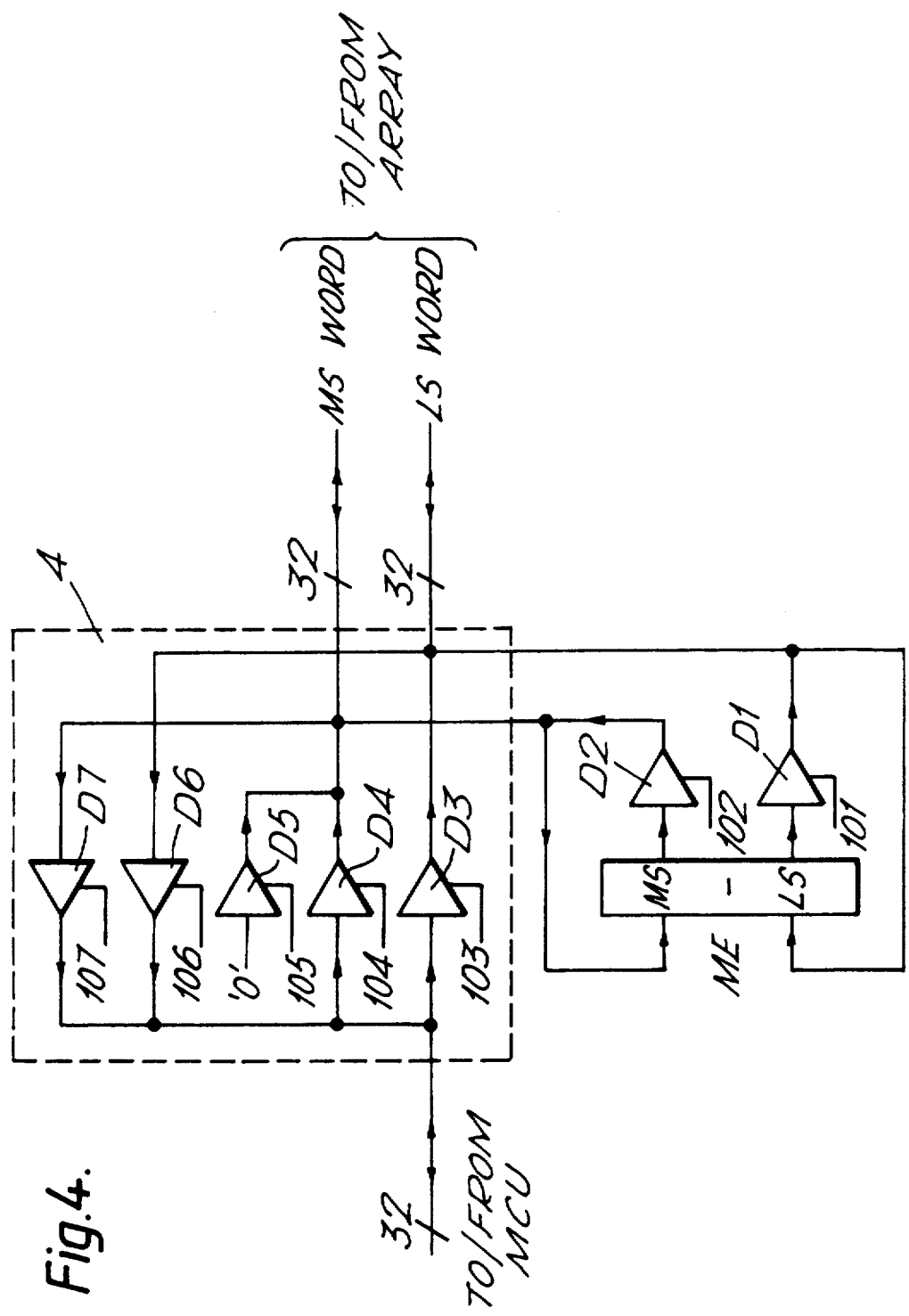

The appropriate method of writing or reading data for a given operation is controlled by the MCU and appropriate control signals transmitted from the MCU to the array support unit 3. The array support unit 3 is shown in detail in FIG. 4. Drivers D1–D7 are provided in the interface circuit 4 and in the output paths from the edge register ME. In response to a signal at its enabling input 101–107 each driver outputs the 32 bit data word provided at its input. In the case of driver 105 the data input is fixed at logical zero: this driver is used to zero extent 32 bit words from the MCU. The control signals supplied by the MCU to the enabling inputs 101–107 for the different addressing modes are shown in Table 1.

In the preferred embodiment the processor system is controlled by a host processor connected via a host connection unit (HCU). The HCU has access to the array so that the host can address the array store as an extension of its own memory. The HCU addresses the array using word addressing in a manner analogous to that used by the MCU registers to read from or write to specified words described above. The format of an array byte address is therefore of the form:

100A AAAA AAAA AAAA AAAA AAAI IIII IW..

where
A = array store bit-plane address
I = array, row or column number
W = word-within-row address and
"." indicates an unused bit position, that is a bit position the value of which is ignored by the hardware.

Although the present invention is described above in relation to a 64×64 bit array it can readily be adapted to other array sizes. For example, a 32-bit scalar MCU can be used with a 128×128 array. The MCU dataflow and control remains identical to that described above for the 32/64×64 bit system, it only being necessary to modify the array support unit 3 by replacing the 64-bit edge register with a 128-bit register and adapting the interface with the MCU registers. Only minor changes are necessary to the address generation in the MCU. Individual words within a row or column can be addressed in a manner precisely analogous to that described above for the 64-bit array but with four words to a row or column rather than merely two. An array address then takes the form:

IAAA AAAA AAAA AAAA AAAA AIII IIII WW..

with the fields A, I, W, having the meanings specified above.

We claim:

1. In a processor array system having an n-bit scalar processor, n-bit scalar processor registers formed in said scalar processor, an m x m-bit processor array, and array support means operatively connected to said scalar processor and processor array, the improvement comprising in combination:
an n-bit wide data path linking said n-bit scalar processor registers to said array support means and an m-bit wide data path linking said array support means to said processor array, where m and n are positive integers and m is an integer multiple of n;
register interface means arranged to interface said n-bit scalar processor registers to said processor array;
an m-bit wide edge register operatively connected to said processor array via said m-bit wide data path; and
address generation means formed in said scalar processor and operatively connected to said register interface means, said address generation means being arranged when in a row-column addressing mode to address a specified row-column of said processor array thereby writing values from one of said n-bit scalar processor registers to n-least significant bit positions of said specified row/column and arranged when in word addressing mode to address a specified one of a plurality of n-bit words of said processor array thereby writing values from one of said scalar n-bit registers to said specified word position.

2. The system of claim 1, wherein said m-bit wide data path linking said array support means to said processor array comprises a most significant word line and a least significant word line arranged in parallel and said register interface means include an LS word line driver having an output side and an input side and operatively connected on said output side to said least significant word line, an MS word line driver having an output side and an input side and operatively connected on said output side to said most significant word line, and a zero extend driver having an input side and an output side, said output side of said zero extend driver being connected in common with said output side of MS word line driver, when said scalar processor is in said row/-column addressing mode one of said MS word line driver and said zero extend driver being enabled in addition to said LS word line driver, said MS word line driver when enabled thereby replicating a word on said least significant word line, and said zero extend driver when enabled thereby zero extending a word on said least significant word line.

3. The system of claim 2, wherein said processor array comprises a plurality of single bit processing elements, and local store operatively connected to each said processing element, said processor array employing an SIMD architecture.

4. The system of claim 1, wherein said processor array comprises a plurality of single bit processing elements, and local store operatively connected to each said processing element, said processor array employing an SIMD architecture.

* * * * *